United States Patent
Kavik et al.

(10) Patent No.: US 10,875,068 B2
(45) Date of Patent: Dec. 29, 2020

(54) METHOD FOR PRODUCING A MOTOR VEHICLE COMPONENT FROM AN EXTRUDED ALUMINUM PROFILE

(71) Applicant: BENTELER AUTOMOBILTECHNIK GMBH, Paderborn (DE)

(72) Inventors: Tobias Svantesson Kavik, Oslo (NO); Amin Farjad Bastani, Gjovik (NO); Edwin List Clausen, Lojt Kirkeby Abenra (DK); Andreas Hitz, Erwitte (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 210 days.

(21) Appl. No.: 15/327,919

(22) PCT Filed: Jul. 22, 2015

(86) PCT No.: PCT/DE2015/100313
§ 371 (c)(1),
(2) Date: Jan. 20, 2017

(87) PCT Pub. No.: WO2016/012009
PCT Pub. Date: Jan. 28, 2016

(65) Prior Publication Data
US 2017/0209909 A1    Jul. 27, 2017

(30) Foreign Application Priority Data
Jul. 22, 2014   (DE) .................. 10 2014 110 320

(51) Int. Cl.
*B21C 3/06*   (2006.01)
*B62D 25/04*   (2006.01)
(Continued)

(52) U.S. Cl.
CPC .............. *B21C 3/06* (2013.01); *B21C 35/023* (2013.01); *B21D 22/02* (2013.01); *B21D 35/006* (2013.01);
(Continued)

(58) Field of Classification Search
CPC ....... B21C 3/06; B21C 35/023; B62D 29/008; B62D 25/04; B21D 35/006; B21D 22/02; B21D 53/88; B21D 35/005
See application file for complete search history.

(56) References Cited

U.S. PATENT DOCUMENTS

| | | |
|---|---|---|
| 2,458,686 A | 1/1949 | Davie, Jr. |
| 2,716,805 A | 9/1955 | Reed |

(Continued)

FOREIGN PATENT DOCUMENTS

| | | |
|---|---|---|
| CN | 102933328 A | 2/2013 |
| DE | 3730117 C1 | 6/1988 |

(Continued)

OTHER PUBLICATIONS

Machine Translation for Matsumoto, JP 2004-255400 A.*
(Continued)

*Primary Examiner* — Christopher J Besler
*Assistant Examiner* — Christine Bersabal
(74) *Attorney, Agent, or Firm* — Hauptman Ham, LLP

(57) ABSTRACT

A method for producing a lightweight sheet-metal component with varying wall thicknesses includes extruding a lightweight metal to form a profile with a non-planar profile cross section, wherein the wall thicknesses of the profile cross section differ from one another in at least two regions, cutting the profile to length into profile pieces, widening the profile pieces, and forming the flattened profile piece into a three-dimensional shaped sheet-metal component, wherein (Continued)

Figure 1:
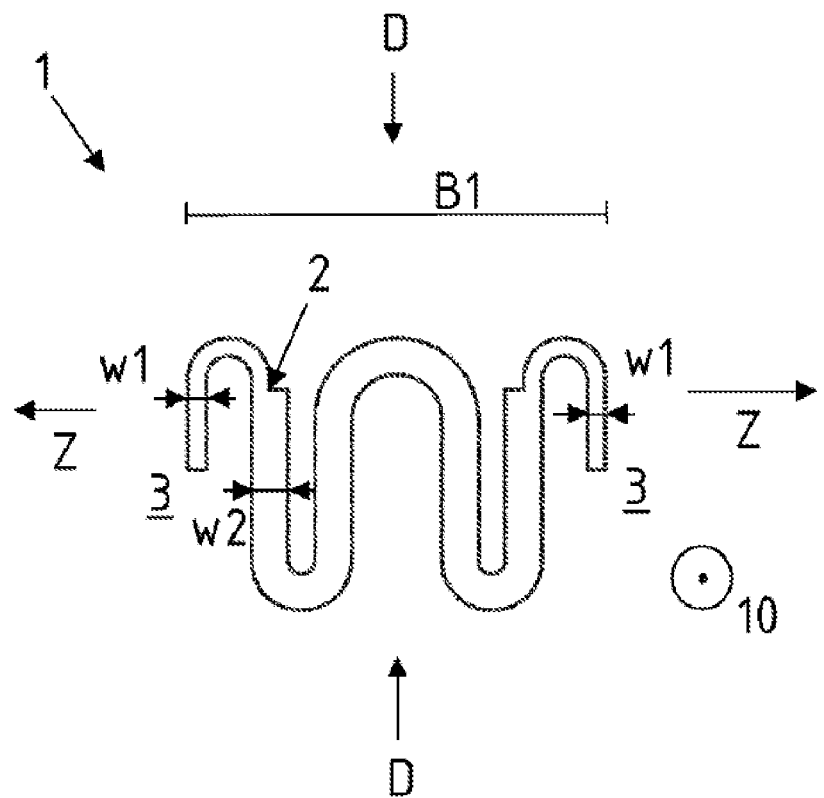

the sheet-metal component has at least two regions with wall thicknesses that are different from one another.

18 Claims, 11 Drawing Sheets

(51) Int. Cl.
*B21D 53/88* (2006.01)
*B21C 35/02* (2006.01)
*B21D 22/02* (2006.01)
*B21D 35/00* (2006.01)
*B62D 29/00* (2006.01)

(52) U.S. Cl.
CPC ............ *B21D 53/88* (2013.01); *B62D 25/04* (2013.01); *B62D 29/008* (2013.01); *B21D 35/005* (2013.01)

(56) References Cited

U.S. PATENT DOCUMENTS

| | | | |
|---|---|---|---|
| 3,062,264 A | 11/1962 | De Ridder et al. | |
| 4,967,473 A * | 11/1990 | Wessel | B21C 23/08 29/527.5 |
| 5,058,266 A | 10/1991 | Knoll | |
| 2009/0155615 A1 * | 6/2009 | Chen | B21D 35/00 428/593 |
| 2010/0098969 A1 * | 4/2010 | Hashimura | B21J 15/025 428/653 |
| 2011/0048091 A1 * | 3/2011 | Kleber | B21C 23/142 72/60 |
| 2012/0319431 A1 * | 12/2012 | Bodin | B62D 29/007 296/203.03 |
| 2013/0104368 A1 | 5/2013 | Flehmig | |
| 2016/0096221 A1 | 4/2016 | Anderseck et al. | |

FOREIGN PATENT DOCUMENTS

| | | | |
|---|---|---|---|
| DE | 102010035136 A1 | 4/2011 | |
| JP | S55106625 A | 8/1980 | |
| JP | 2002282981 A * | 10/2002 | ........... B21C 23/142 |
| JP | 2004255400 A * | 9/2004 | ........... B21C 37/065 |
| JP | 2004255400 A * | 9/2004 | ........... B21C 37/065 |
| JP | 2011045923 A * | 3/2011 | |
| WO | 2014187442 A1 | 11/2014 | |
| WO | WO 2014187442 A1 * | 11/2014 | ............ B21C 37/02 |
| WO | WO-2014187442 A1 * | 11/2014 | ............ B21C 37/02 |

OTHER PUBLICATIONS

Machine Translation for Lindner, WO 2014187442 A1.*
Partial Human translation of JP2004255400, Matsumoto (Year: 2004).*
Machine Translation of JP2002282981, Kitano (Year: 2002).*
Machine Translation for JP-2011045923-A (Kasurida) (Year: 2011).*
International Search Report for Application No. PCT/DE2015/100313 dated Nov. 10, 2015.
Chinese Office Action and Search Report for Application No. 201580039459.5, dated Jan. 11, 2018, 15 pp.
Office Action for Chinese Application No. 201580039459.5 dated Oct. 9, 2018; 12pp.
Office Action for Chinese Application No. 201580039459.5 dated May 7, 2019; 11pp.

* cited by examiner

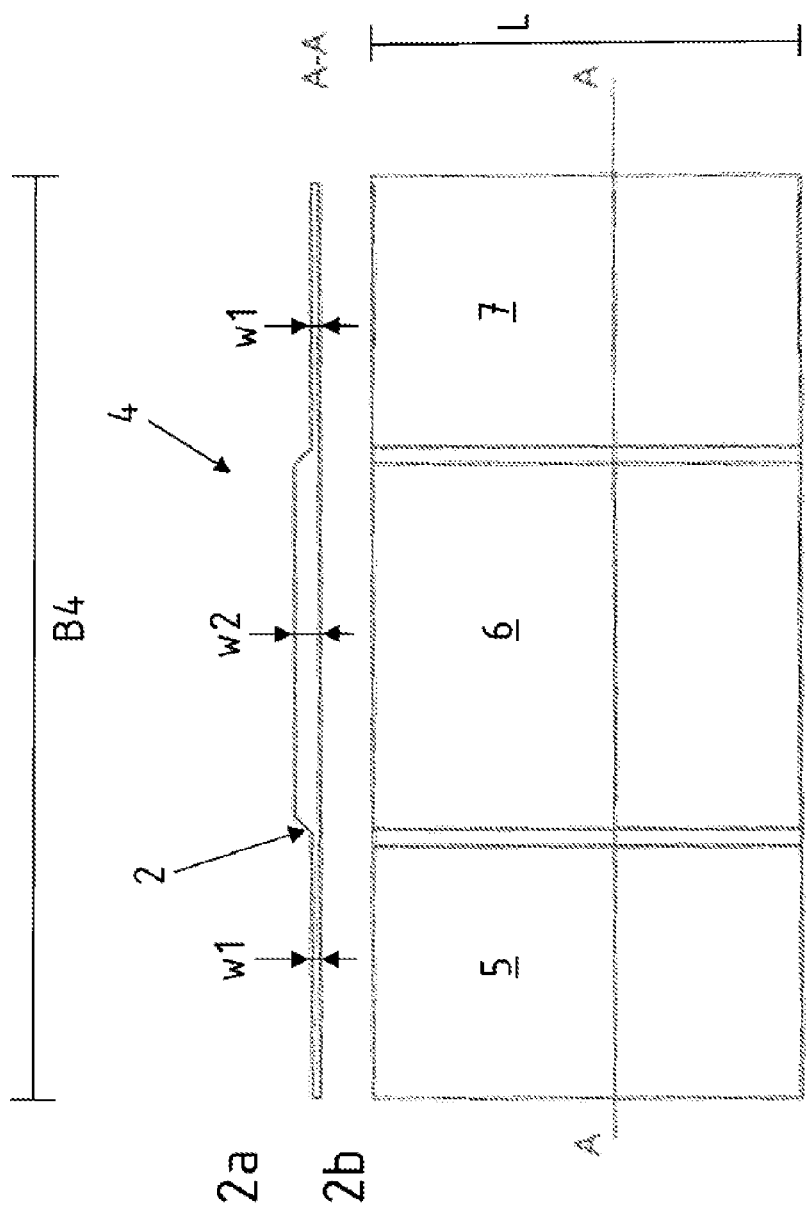

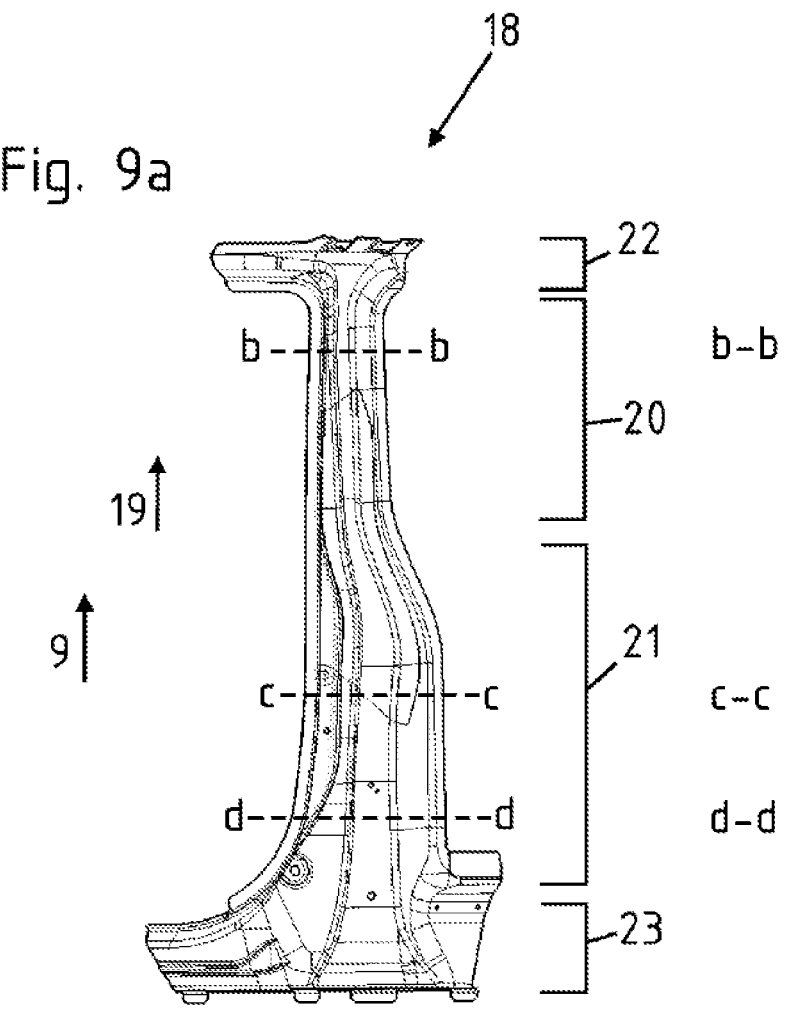

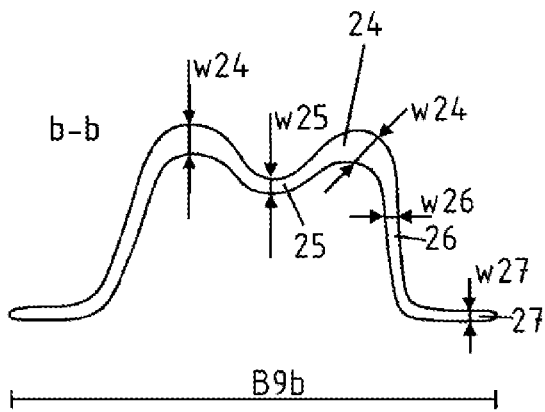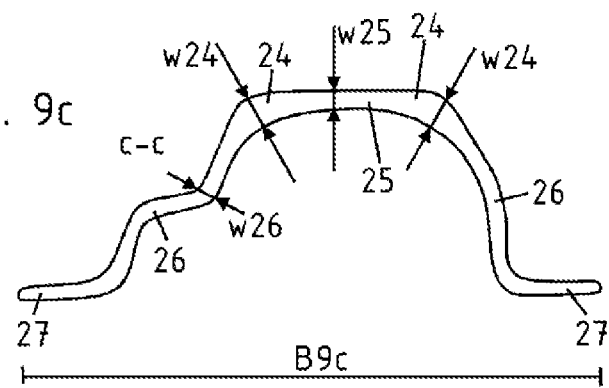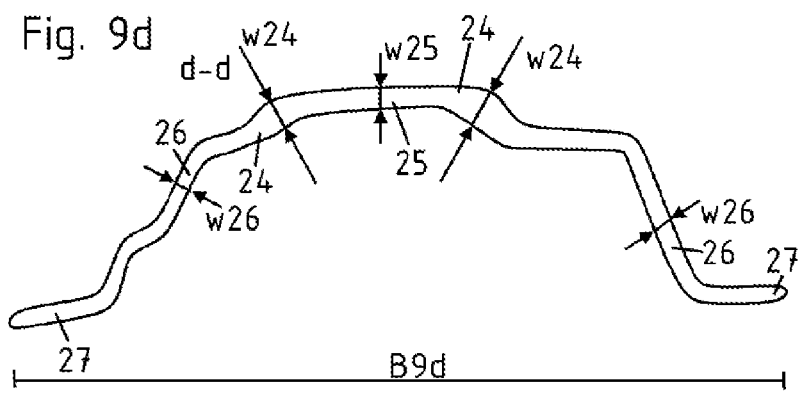

METHOD FOR PRODUCING A MOTOR VEHICLE COMPONENT FROM AN EXTRUDED ALUMINUM PROFILE

The present application is a National Phase of International Application Number PCT/DE2015/100313, filed Jul. 22, 2015, and claims priority to German Application Number 10 2014 110 320.3, filed Jul. 22, 2014.

The present invention relates to a method for producing a light metal component with mutually different wall strength.

Motor vehicle structural components as well as body components are used in the production of motor vehicle bodies. These are manufactured for the most part from sheet steel, such that, on the one hand, sufficient degrees of forming freedom are available and, on the other hand, sufficient strength is achieved. The production process in most cases provides for a sheet metal blank to be made available, which is inserted into a forming tool, in particular into a press forming tool, and is then press formed so that the sheet metal component is end formed into a motor vehicle component.

As a result of the consistent demand for lightweight construction, motor vehicle components and in particular also motor vehicle structural components are produced by hot forming and press hardening, in order to reduce the specific component weight by the use of a steel alloy while maintaining at least constant, or even increased strength.

As an alternative, motor vehicle components are produced from light metal, wherein in particular aluminum alloys find an application here. Here, too, sheet metal blanks made of light metal, in particular made of aluminum, are made available, which are inserted into a press forming tool and are end formed into the motor vehicle component.

Components with mutually different wall strengths are produced in order further to improve the component properties with regard to a reduction in the component weight while maintaining at least constant, or even increased rigidity. The regions of the component that are intended to exhibit high rigidity and/or resistance in the event of an impact involving the vehicle in addition possess a greater wall strength, and regions of the component that are subjected to a smaller load on the other hand possess a smaller wall strength. In order to produce the components, sheet metal blanks with mutually different wall strength are made available, which are known as tailored material. A suchlike tailored material is produced either by rolling (tailor rolled blank) or by welding together sheet metal blanks with mutually different wall strength (tailor welded blank).

The production costs of such tailored materials are comparatively high, wherein the transitional regions of the various wall strengths are mutually dependent, for example, on the degree of rolling reduction or on the thermal joining in the case of welded tailored sheet metal.

The object of the present invention, based on the prior art, is accordingly to propose a method for producing a light metal component with mutually different wall strength, which method is capable of being performed more cost-effectively compared with production methods that are familiar from the prior art, while improving the forming possibilities at the same time.

The aforementioned object is accomplished according to the invention with a method for producing a light metal component with mutually different wall strength.

Advantageous variant embodiments of the present invention are described herein.

The inventive method for producing a light metal component, in particular a light metal sheet metal component, with mutually different wall strength is characterized by the following process steps:
- extruding a light metal to form a profile having an uneven profile cross section, wherein the wall strength of the profile cross section is mutually different in at least two regions,
- cutting the profile to length into profile pieces,
- widening the profile pieces,
- forming the flattened profile piece into a three-dimensionally formed sheet metal component, wherein the sheet metal component has at least two regions with mutually different wall strength.

According to the invention, the light metal, which in particular is aluminum or an aluminum alloy, is thus made available initially, for example in the form of an aluminum light metal bar or also a light metal ingot. The light metal that is made available in this form is then heated to an extrusion temperature, which lies in the range preferably from 400° C. to 560° C., and particularly preferably from 470° C. to 530° C., and is then extruded. A profile which has a mutually uneven profile cross section is produced by means of extruding, wherein the profile cross section has mutually different wall strengths in at least two regions.

The expression uneven profile cross section is understood in the context of the invention to denote in particular an undulating, arched or curved profile cross section. This is precisely where a significant advantage of the invention lies, so that not a single blank needs to be produced in its full width, but, because of the uneven profile cross section in conjunction with the subsequent widening, the blank is capable of being produced with an initially highly compacted width or with a reduced width. By virtue of the extrusion process, on the one hand the forming freedom is freely selectable in the uneven or undulating or bent cross section. On the other hand, however, the wall thickness or the wall strength is also freely selectable over the cross section, with the result that steps in the wall thickness can be realized without a transitional zone, or linearly or progressively or degressively increasing or decreasing enlargements or reductions in the wall thickness can be formed over the cross section.

The resulting profile is then particularly preferably cut to length into profile pieces. The resulting profile pieces can then be manipulated or easily handled in further process operations. For example, profile pieces with a length of 1 m, 2 m or even 3 m are cut to length. On the one hand, the profile pieces can be easily transported and stored and supplied for further processing steps.

These further processing steps include, in particular, widening of the profile piece transversely to the direction of extrusion. Widening in this case is performed in particular as preforming or flattening. The expression flattening should not be understood initially in the context of the invention to denote that the profile piece must be flattened in its cross section so that it is completely flat or even, taking into account the mutually different wall strengths, although this may be an integral part of the invention. The expression flattening is understood initially in the context of the invention to denote that the cross section is changed, in particular pressed flatter, so that the profile piece is widened. The expression preforming is likewise understood in the context of the invention to denote that the profile piece is brought into a preform for subsequent forming. Preforming in this case is carried out preferably as press forming. As an alternative or in addition, preforming can be carried out as tensile forming, so that the lateral ends of the profile piece are pulled apart and, as a result, the cross section of the profile piece is brought into a preform. A roll forming process can also be used, as an alternative, so that the profile piece is continuously formed and widened in the longitudinal direction. The roll forming process in this case is carried out in such a way that a forming contour enters into the profile piece in the longitudinal direction and, in so doing, widens the profile piece. Widening can also be carried out in the context of the invention by a rolling process.

Widening, in particular flattening, in this case can take place in the context of the invention in a variety of preferred ways. Either the profile piece is widened, in particular flattened, in a press forming tool, so that the inserted profile piece is accordingly widened or flattened in conjunction with the movement of an upper tool and a lower tool towards one another.

In the course of the flattening itself, it is again possible to produce a preform, which either corresponds to an even or flat blank, or a preform to be end formed subsequently into the sheet metal component. It is also possible in the context of the invention, however, for the sheet metal component to be end formed directly in conjunction with widening or flattening. The profile piece is flattened and, at the same time, end formed for this purpose in the forming tool, preferably the press forming tool.

An alternative or also additional variant embodiment of the inventive method proposes that flattening takes place in relation to its width by the application of a tensile force in the respective end region, and therefore at opposite ends of the profile piece. The profile piece is pulled apart, and the profile piece that is uneven in its cross section, in particular the undulating profile piece, is thus pulled apart and, in so doing, flattened once more. A preform is also produced during this procedure, with the result that the sheet metal component to be produced is end formed from the preform in a further processing step, in particular a forming step.

A further embodiment of the invention proposes, for flattening or widening, that the profile piece is widened by roll forming or rolling, in particular in the longitudinal direction. This also makes it possible for widening to be achieved in the transverse direction.

It is especially preferred, in addition, for a profile piece having an undulating cross section to be extruded, wherein the cross section possesses in particular W-shaped undulations. It is also possible, however, in the context of the invention to produce the cross section in an Ω shape, a ω shape, a pi shape or in any desired combination. A cross section having 4, 5, 6, 7 or 8 undulations similar to a concertina in its cross section is also conceivable. However, the cross section must also be selected advantageously in such a way that it exhibits a similarity to the cross-sectional form of the component to be produced, since in this way the forming forces to be applied and the degrees of forming arising in the process are also reduced so to speak. A preferably W-shaped and/or pi-shaped cross sectional profile is selected, for example, for producing a motor vehicle pillar, in particular a B-pillar, which has a hat-shaped cross section.

Precipitation hardenable 6000-series or 7000-series aluminum alloys are used in the context of the invention. It has been found to be particularly advantageous in this case in the context of the invention for the extrusion profile to be produced with a width that is smaller by a factor of between 1.5 and 10, and preferably between 1.5 and 3, than the width or the length of the component to be produced. What this means, in the case of a component which exhibits an increase in its length, which is oriented transversely to the direction of extrusion of the profile that is produced in the course of the extrusion, as a result of which the length of the component is dependent on the width of the extruded profile, is that the width of the extruded profile is in a proportion of 1 to between 1.5 and 10, in particular a proportion of 1 to between 1.5 and 3, to the width or the length of the sheet metal component or the preform. This means that the component is subsequently between 1.5 and 10 times as long as the initial width of the extruded and non-flattened profile.

If the longitudinal direction of the produced component extends to such an extent in the direction of extrusion of the profile, it is also preferable to see the component width of the produced sheet metal component in relation to the width of the extruded profile in a proportion of between 1.5 and 10 to 1, in particular between 1.5 and 3 to 1. Here, too, the width of the component is then between 1.5 and 10 times greater than the width of the extruded profile. This means that the profile is widened by between 1.5 times and 10 times during flattening and is further processed into the end formed sheet metal component.

Better degrees of forming freedom and better design possibilities are thus available on the whole for components with mutually different wall strengths over their cross-sectional development, in association with reduced production costs. It is also possible in the course of further forming, as a result of the pre-assembly of the extruded profile in relation to the cross section of the sheet metal component to be produced, to achieve lower degrees of forming and associated damage in the structure of the component, which has a positive effect in relation to any thermal post-treatment or even results in the elimination thereof. Lower forming forces are also required, since the extruded profile or a preform produced therefrom already exhibits cross-sectional similarities to the cross section of the sheet metal component to be produced, and there is accordingly no need for a completely even, three-dimensionally complex blank to be formed.

Figure 3A:
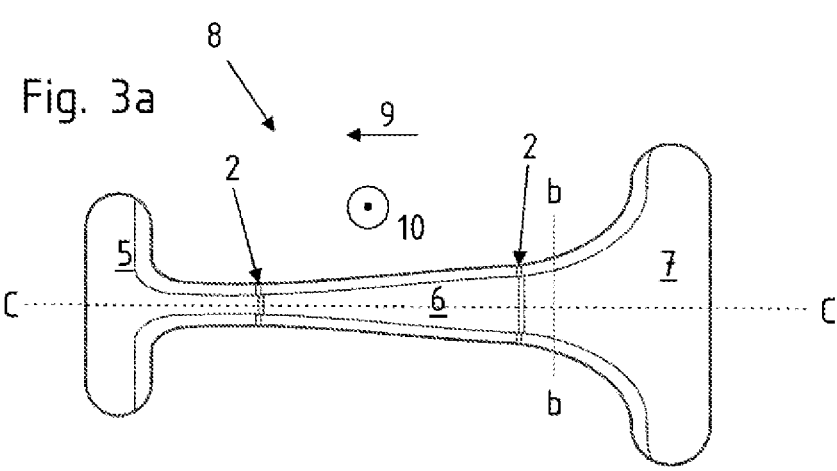
Figure 3B:
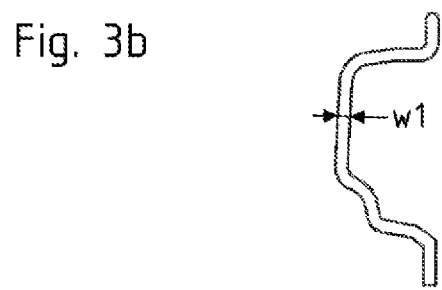
Figure 3C:
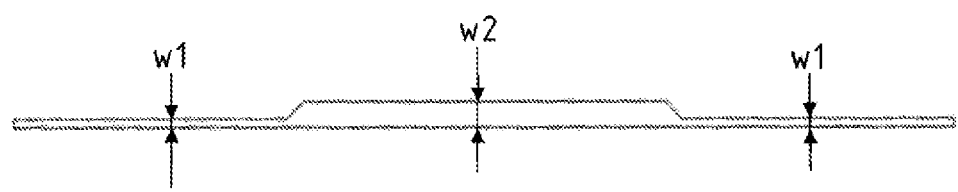
Figure 4A:
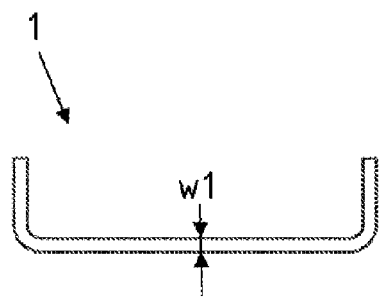
Figure 4B:
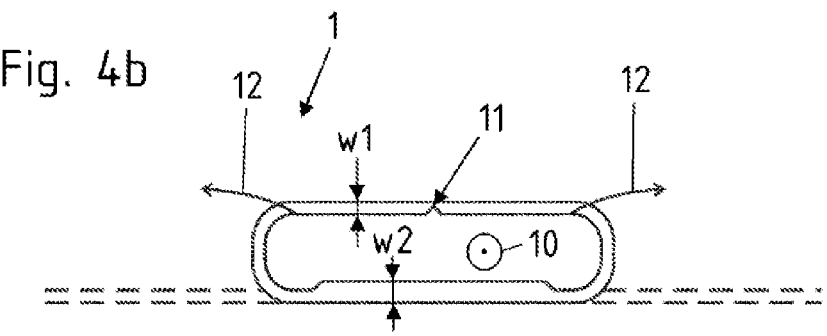
Figure 4C:
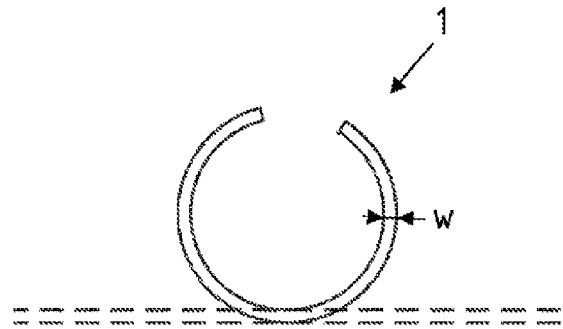
Figure 4D:
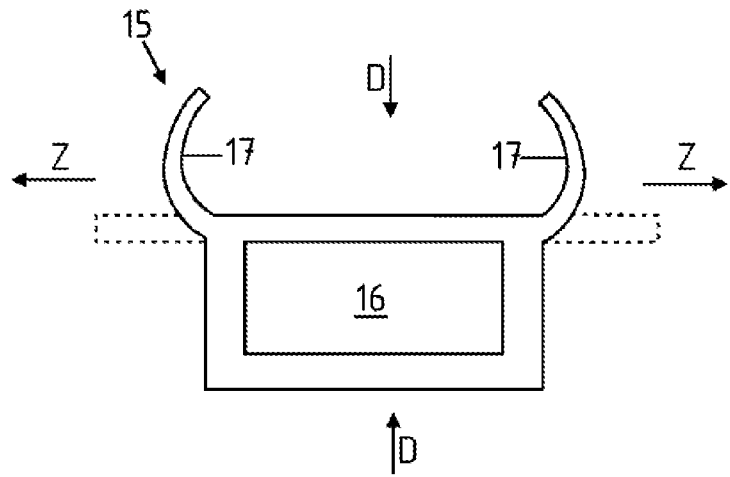
Figure 5B:
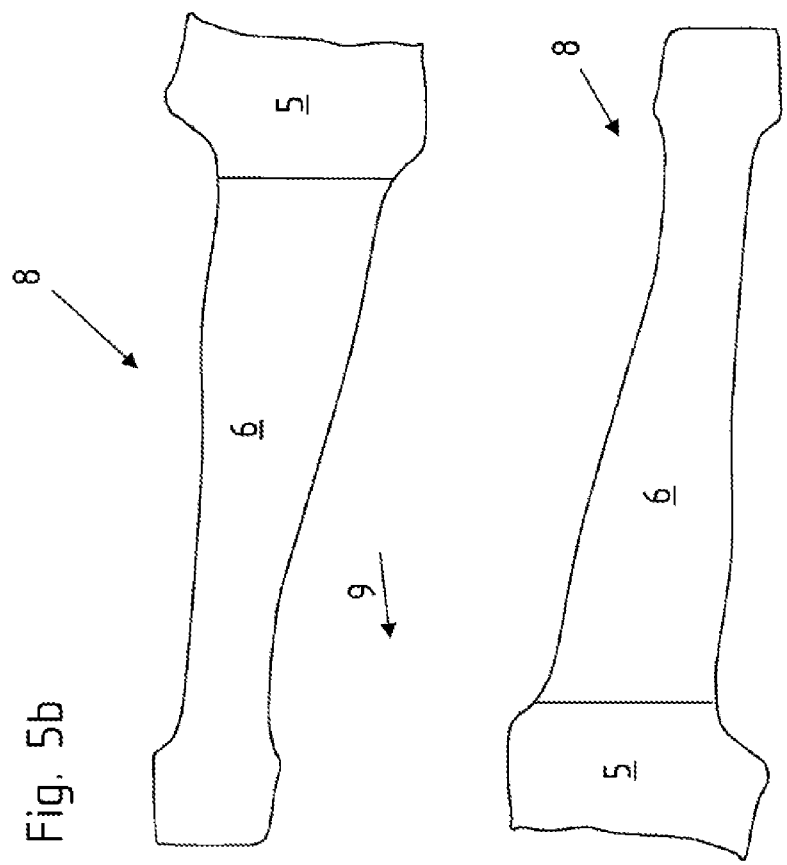
Figure 5A:
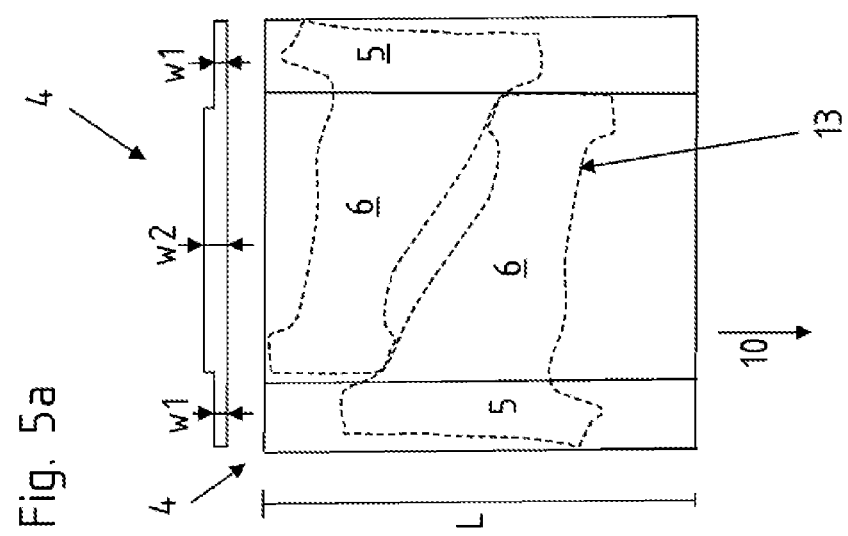
Figure 6B:
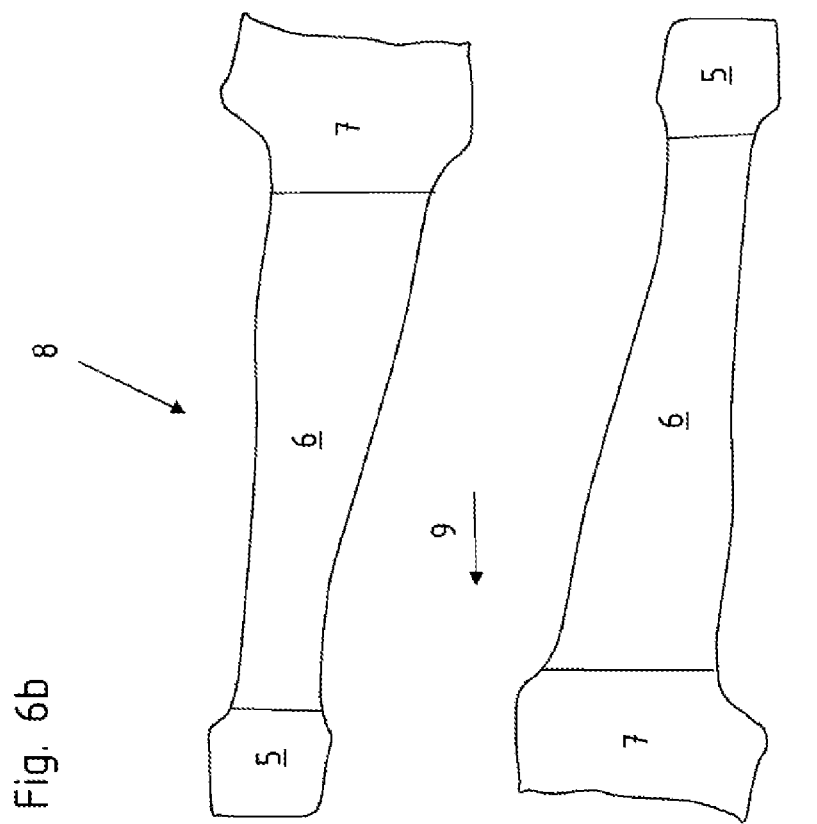
Figure 6A:
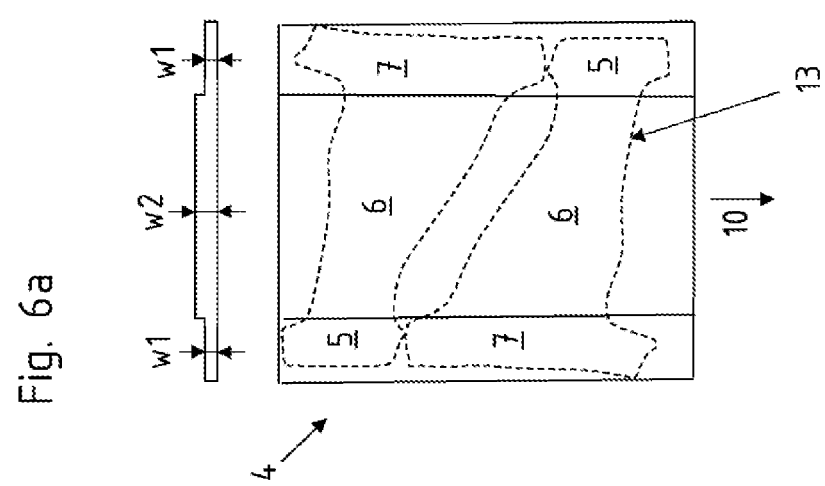

Further advantages, characterizing features, properties and aspects of the inventive method are included in the following description. Preferred variant embodiments are represented in the schematic figures. These serve to facilitate the understanding of the invention. In the figures:

FIG. 1 depicts an extruded profile produced according to the invention in a cross-sectional view, FIGS. 2a and 2b depict the profile in FIG. 1 as a flattened profile piece, FIGS. 3a to 3c depict a motor vehicle B-pillar produced from the profile piece according to FIG. 2, FIGS. 4a to 4d depict alternative, mutually different cross-sectional profiles, FIGS. 5a and 5b depict two motor vehicle B-pillars with two mutually different wall strengths, FIGS. 6a and 6b depict two motor vehicle B-pillars with three mutually different wall strengths, FIGS. 7a to 7d depict a production method for an inventive motor vehicle B-pillar, FIGS. 8a to 8d depict a motor vehicle B-pillar produced with the inventive method in a top view and various cross-sectional views, and FIGS. 9a to 9d depict an alternative variant embodiment of the motor vehicle B-pillar produced with the inventive method.

The same reference designations are used in the figures for the same or similar components, including if a repeated description is omitted for the sake of simplicity.

FIG. 1 depicts the produced profile 1 according to the invention in cross section. It can be clearly appreciated that the profile 1 exhibits an uneven cross-sectional development, which in particular is undulating and is configured in the form of a W. It can also be appreciated that the profile 1 in cross section exhibits two mutually different wall strengths w1 and w2, wherein w2 is represented here as being larger than w1. Otherwise, however, the wall strength w1 remains constant over the cross-sectional development and the wall strength w2 remains constant in the respective region. It is conceivable in the context of the invention, however, for the wall strengths w1, w2 also to vary, for example to increase or reduce, since the degrees of forming freedom are defined in relation to the wall strength w1, w2, in particular dependent on the extruding. A difference in thickness thus occurs at a point of transition 2 from wall strength w2 to wall strength w1, but without the wall strength w2 at this point decreasing linearly, for example. A different arrangement would also be conceivable, however.

According to FIG. 1, the cross section of the profile is widened, in particular flattened, which takes place either as a result of the application of a tensile force Z at the ends 3 of the profile 1, or also optionally in addition by the application of a compressive force D to the profile 1. Widening must not necessarily result in the preform 4 represented in FIG. 2*a*, which is configured as an essentially even blank. Widening may be implemented only partially, so that an uneven cross-sectional development always remains.

FIG. 2 depicts the blank in cross section, and FIG. 2*b* depicts the blank as a preform 4 in a top view. The blank in this case exhibits a length L, which the profile 1 possesses after cutting to length to form the profile piece. In point of fact, the blank possesses a width B4, which is preferably between 1.5 times and 10 times wider compared with the width B1 of the profile 1 represented in FIG. 1. The preform 4 thus possesses three regions 5, 6, 7, each with a mutually different wall strength w1, w2, wherein region 5 and region 7 respectively have the wall strength w1, and region 6 has the wall strength w2. At the transition, this results in a represented linear decrease in the transition 2, although this can also be configured in cross section as an increase in thickness, for example, or even as a progressively or degressively developing transition 2.

FIGS. 3*a*, 3*b* and 3*c* depict a sheet metal component 8 produced in the form of a motor vehicle pillar. The preform 4 depicted as a blank in FIG. 2 is further processed in a forming tool, in particular in a deep-drawing tool, or also in a pressure forming tool, in particular a press forming tool, to produce the represented sheet metal component 8. Three regions 5, 6, 7 with mutually different wall strength w1, w2 are also configured here, however, wherein this can be appreciated in particular in figures b and c, which depict a longitudinal and cross-sectional view through the motor vehicle pillar according to the cutting lines b-b and c-c in FIG. 3*a*. It can be clearly appreciated in FIG. 3*b* that the wall strength w1 in the region 7 is configured over the entire cross section, whereas according to FIG. 3*c* three regions 5, 6, 7 with mutually different wall strength w1, w2 are configured over the development in the longitudinal direction 9 of the sheet metal component 8. The great benefit of this is that the longitudinal direction 9 of the sheet metal component 8 is oriented essentially orthogonally to the direction of extrusion 10 of the profile 1. The longitudinal direction of the component is therefore oriented in the direction of the width of the profile 1.

FIGS. 4*a* to 4*c* depict various preferred variant embodiments for the production of a profile cross section of the inventive profile 1. The profile 1 according to FIG. 4*a* is of U-shaped configuration in its cross section, wherein it has an essentially constant wall strength w1, whereas then profile 1 according to FIG. 4*b* is configured with a closed cross section or as an oval rectangle. In particular, a predetermined breaking point 11 in the form of a notch is also extruded on the profile 1 in the direction of extrusion 10. As the forming progresses, this can then be bent upwards in the direction of the loading deflections 12. The profile 1 also exhibits mutually different wall strengths w1, w2. It would also be conceivable for the flattening in this case to be carried out by a widening process or also by a roll forming process, whereas the end forming is then preferably carried out again in the press forming tool.

FIG. 4*c* depicts a further variant embodiment, wherein an open circular profile is represented in this case. This is again capable, although not represented in any more detail, of having a varying wall strength w1, w2 over its cross-sectional development. FIG. 4*d* depicts a further variant embodiment of the present invention. A hollow profile 15, which exhibits a hollow chamber 16, is extruded initially in this case. Extending from the hollow chamber 16 are legs 17, likewise with an uneven cross section, so that, as represented, these protrude in a curved manner in relation to the hollow chamber 16. The legs 17 are widened laterally by the application of a tensile force Z and/or a compressive force D, or alternatively a roll forming or rolling process, wherein the hollow chamber 16 essentially retains its cross-sectional contour. It is also possible, however, in the context of the invention for the hollow chamber 16 likewise to be modified in its cross section by widening. The hollow chamber 16 is thus capable in particular of being flattened. It is particularly conceivable, however, in the context of the invention for the hollow chamber 16 to be brought into its final cross-sectional contour by the further processing step, in particular an end forming process. It is also conceivable, of course, in the context of the invention for a multiple-chamber hollow profile, that is to say having two, three or four hollow chambers, to be extruded and subsequently to be widened.

FIGS. 5*a* and 5*b* depict a further variant embodiment of the present invention, wherein in this case the preform 4 is again produced with two regions 5, 6 having mutually different wall strength w1, w2. The preform 4 again exhibits the length L of a profile piece, wherein this is dimensioned in such a way that two sheet metal components 8 can be cut from the preform 4. These two sheet metal components 8 lie opposite one another and each exhibit two regions with mutually different wall strength w1, w2. The preform 4 is thus cut initially, wherein the cut can also correspond to the final contour, and the cutting 13 is a final cut, or the cutting 13 is once more performed as a final cut after completion of the end forming. It is also clearly visible that the longitudinal direction 9 of the sheet metal components 8 is again oriented orthogonally to the direction of extrusion 10 of the profile 1.

FIGS. 6*a* and 6*b* depict an analogous variant embodiment, with the difference that three regions 5, 6, 7 having mutually different wall strength w1, w2 are configured in the component. In this case, too, the longitudinal direction 9 of the produced sheet metal component 8 extends orthogonally in relation to the direction of extrusion 10 of the preform 4.

Figure 7A:
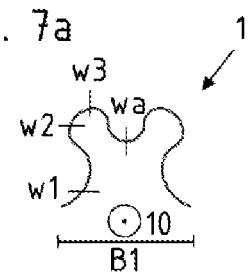
Figure 7B:
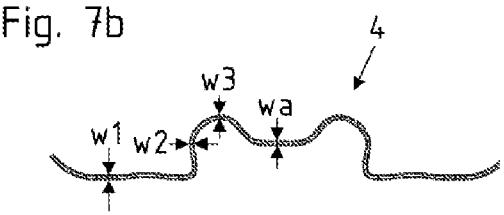

FIGS. 7*a* to 7*d* depict an alternative variant embodiment. A profile 1 with pi-shaped undulation in its cross section according to FIG. 7*a* is extruded initially. The profile 1 exhibits various regions 5, 6, 7 having mutually different wall strengths w1, w2, w3 and wa. The resulting extruded, undulating, pi-shaped profile is then widened in a further processing step to produce the preform 4, as represented in FIG. 7*b*. In this case, the preform 4 already essentially has a cross section in the direction of extrusion 10, which the sheet metal component 8 to be produced subsequently should also possess here in the form of a motor vehicle pillar, and the local degrees for forming are therefore reduced.

Figure 7C:
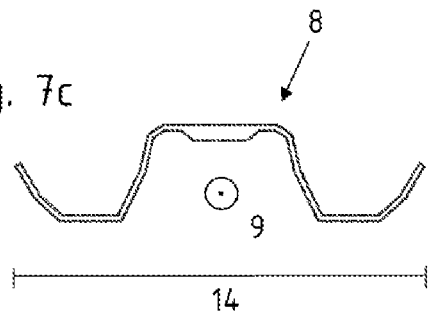
Figure 7D:
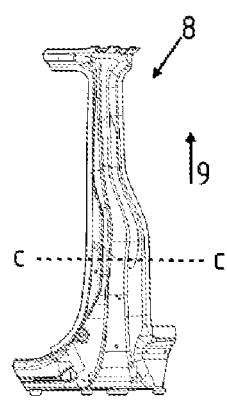

The sheet metal component 8 is then produced in a further forming step, in this case too in the form of a motor vehicle B-pillar, which exhibits mutually different wall strengths W1, W2 transversely to its longitudinal direction, as represented in FIGS. 7c and d. In this case, the longitudinal direction 9 of the sheet metal component 8 to be produced is oriented in the direction of extrusion 10 of the profile 1. The width of the produced component 14 thus corresponds to between 1.5 and 10 times, in particular between 1.5 and 3 times, the width of the profile B1.

Figure 8A:
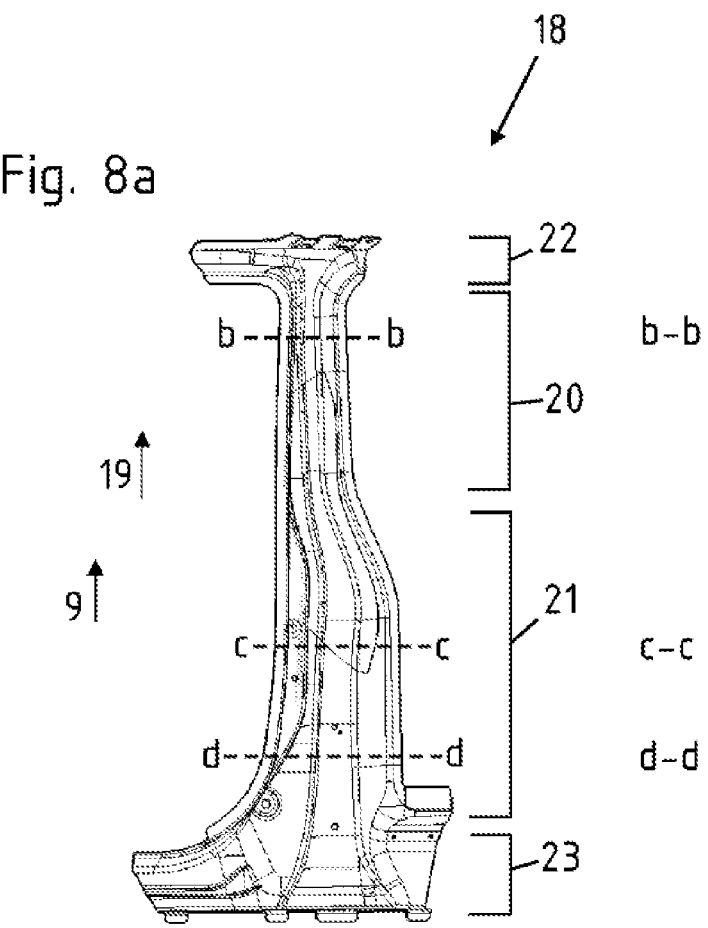

FIG. 8a depicts a motor vehicle pillar 18 in the form of a B-pillar produced by the inventive method. The longitudinal direction 9 of the motor vehicle pillar 18 in this case extends in the vertical direction 19 of the motor vehicle. An upper part 20 in this case exhibits a smaller width compared with a lower part 21. Also represented is a head section 22 for connection to a roof rail, which is not represented in more detail, and a foot section 23, which have again been widened. The head section 22 and the foot section 23 can be produced in a single piece, likewise with the inventive method.

Figure 8B:
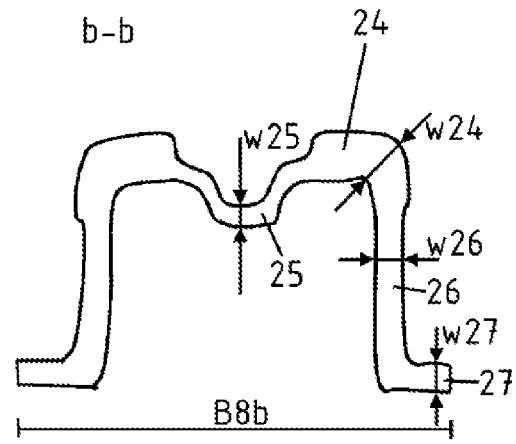
Figure 8C:
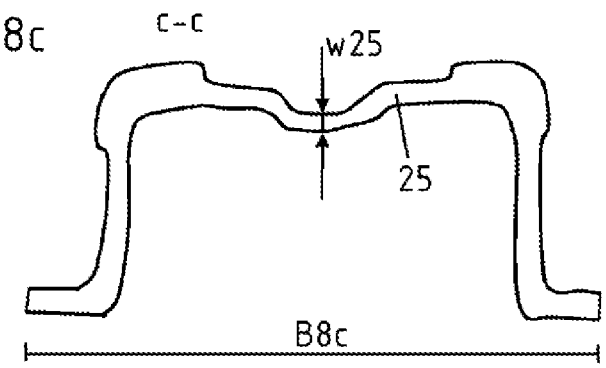
Figure 8D:
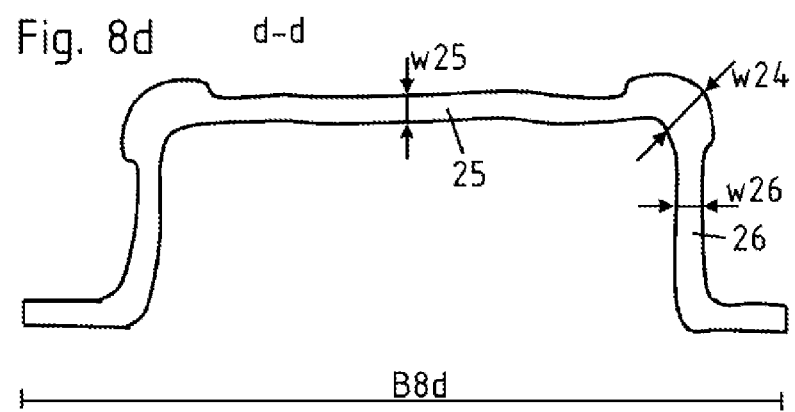

Represented in FIGS. 8b to 8d are various cross-sectional views according to the cutting lines b-b, c-c, d-d. It can be clearly seen here that a width B8b is of smaller configuration than a width B8c. The width B8c is in turn of smaller configuration than the width B8d.

In order to produce the motor vehicle pillar 18 with the inventive method, a profile that is not represented here in more detail is extruded initially, which profile exhibits a width that is smaller than or equal to the width B8b. This profile exhibits a development that is undulating or hat-shaped in its cross section, as well as mutually different wall strengths.

Represented for this purpose is a wall strength w24, which is formed in the corner regions, including the radial regions 24. A wall strength w25 is configured, on the other hand, which is arranged in a step region 25. The step region 25 exhibits an undulation. Also represented is a wall strength w26, which is configured on the lateral legs 26. Also configured is a wall strength w27, which is arranged on the protruding flanges 27. By virtue of the extrusion of the profile, it is possible to design the wall strengths w24, w25, w26, w27 and the transitions so that they are flexible in respect of their thickness. The wall strength w25 in particular is smaller than the wall strength w24. The wall strength w26 is preferably the same as the wall strength w27, although the wall strength w27 may be smaller than the wall strength w26. The wall strength w26 is in turn preferably greater than or equal to the wall strength w25 and smaller than or equal to, and in particular smaller than the wall strength w24.

It can be clearly appreciated that the width B8b, B8c, B8d of the motor vehicle pillar 18 increases from now on, from the upper part 20 to the lower part 21. This is particularly noticeable because of a widening of the step region 25. The step region 25 is preferably capable of particularly easy forming, since it is here in particular that the smallest wall strength w25 is present.

The forming of the motor vehicle pillar 18 takes place in particular by inserting the cut-to-length, extruded profile into a press forming tool. The motor vehicle pillar 18 is most preferably formed from the profile 1 to form the finished motor vehicle pillar 18 by means of a forming step. The connection region to the head section 22 and the connection region to the foot section 23 can then be produced in a single piece using uniform material, for example by further flattening and widening of the profile 1.

In the representation according to FIG. 8d, the step region 25 is almost completely widened, which again results in the width B8d, which is greater than the width B8c and, in particular, greater than the width B8b. However, the wall strength w26 in the legs 26 as well as the wall strength w24 in the rail regions 24 is again configured to be greater than the wall strength w25. This affords adequate lateral rigidity in the case of a side impact. At the same time, the small wall strength w25 is associated with slight deformability in the production of the motor vehicle pillars 18, in particular in conjunction with widening the step regions 25.

FIG. 9a depicts an alternative variant embodiment of a motor vehicle pillar 18, in particular a B-pillar, wherein mutually different cross-sectional views are again represented in FIGS. 9b to 9d. According to the cross-sectional views in FIGS. 9b to 9d, it can be appreciated that the profile 1 that is used here exhibits a different cross-sectional configuration in the initial state in comparison with FIGS. 8b to 8d. FIGS. 8b and 9b respectively depict the cross section of the upper part 20, which essentially corresponds to the cross section of the profile 1, since this experiences only a small change in shape here.

It can also be appreciated in FIGS. 9c and 9d that the undulating step region 25 according to FIG. 9b is extended or widened, which results in a greater width B9c and B9d compared with the width B9b. In modification to FIG. 8, however, the left leg 26 in relation to the plane of the drawing is also of S-shaped configuration in this case. The wall strength w26 of the leg 26 is smaller than the wall strength w24 in the respective radial region 24, such that comparatively simpler forming is also possible in this case, too. Flanges 27 are likewise protruding. In the lower region 21, the respective leg 26 is configured with at least one undulation and is of double S-shaped configuration on the left side in relation to the plane of the drawing. In this case, too, the small wall strength w26 in relation to the wall strength w24 of the respective radial region 24 provides for simpler forming and the need for the application of lower forming forces. The greater wall strength w24 in the respective radial region 24 in this case ensures the adequate flexural rigidity of the B-pillar. At the same time, however, the wall strength w24 is configured in the radial regions 24, which are not subjected to any major change in shape in the subsequent widening and forming process for producing the motor vehicle pillar 18.

LIST OF REFERENCE DESIGNATIONS

1 profile
2 transition
3 end of 1
4 preform
5 region
6 region
7 region
8 sheet metal component
9 longitudinal direction to 8
10 direction of extrusion
11 predetermined breaking point
12 loading deflections
13 cutting
14 width according to FIG. 7
15 hollow profile 16 hollow chamber
17 leg
18 vehicle pillar
19 vehicle vertical direction
20 upper part
21 lower part
22 head section
23 foot section
24 radial region
25 step region
26 leg
27 flange
B1 width
B4 width
B8 width
B8b width
B8c width
B8d width
B9b width
B9c width
B9d width
D compressive force
L length
w1 wall strength
w2 wall strength
w3 wall strength
w24 wall strength
w25 wall strength
w26 wall strength
w27 wall strength
wa wall strength
wr wall strength
ws wall strength
Z tensile force

The invention claimed is:

1. A method of producing a light metal component with mutually different wall strengths, the method comprising:
   extruding a light metal to form a profile having an undulating profile cross section, wherein the profile cross section has mutually different wall strengths in at least two regions;
   cutting the extruded profile to length to obtain a profile piece;
   widening the profile piece, wherein said widening comprises:
      inserting the profile piece into a press forming tool, and moving together a top tool and a bottom tool in the press forming tool toward each other to perform flattening the profile piece into a preform component as a planar sheet of metal with mutually different wall strengths in at least two regions; and
   forming the preform component into a three-dimensionally formed sheet metal component, wherein the sheet metal component has at least two regions with mutually different wall strengths.

2. The method as claimed in claim 1, wherein the profile cross section is omega-shaped, pi-shaped or w-shaped.

3. The method as claimed in claim 1, wherein by moving together the top tool and the bottom tool in the press forming tool, the profile piece is completely flattened into the preform component as the planar sheet of metal with mutually different wall strengths.

4. The method as claimed in claim 1, wherein said forming the preform component into the sheet metal component is performed in conjunction with said widening such that the profile piece is flattened and end formed in the press forming tool.

5. The method as claimed in claim 1, wherein said widening further comprises application of a tensile force in a plane of a blank to be produced, the tensile force being applied at opposing ends of the profile piece.

6. The method as claimed in claim 1, wherein the light metal is a 6000-series or 7000-series aluminum alloy, and
in said extruding, the light metal is extruded at a temperature of 400° C. to 560° C.

7. The method as claimed in claim 1, wherein the extruded profile has a width, which is in a proportion of 1 to between 1.5 and 10, to a width or a length of the sheet metal component or the preform component.

8. The method as claimed in claim 1, further comprising: cutting and/or perforating the profile piece before, during or after said flattening.

9. The method as claimed in claim 1, wherein the produced sheet metal component has a longitudinal direction which corresponds to an extrusion direction in which the light metal is extruded in said extruding.

10. The method as claimed in claim 1, wherein in said widening, the profile piece is widened in a direction transverse to an extrusion direction in which the light metal is extruded in said extruding.

11. The method as claimed in claim 1, wherein said widening is further carried out by roll forming or rolling.

12. The method as claimed in claim 1, wherein the sheet metal component is produced as a vehicle pillar, a longitudinal direction of the vehicle pillar corresponds to an extrusion direction in which the light metal is extruded in said extruding,
the vehicle pillar has a profile of a hat-shaped cross section with mutually different wall strengths, and
the hat-shaped cross section varies in the longitudinal direction of the vehicle pillar.

13. The method as claimed in claim 12, wherein the hat-shaped cross section of the vehicle pillar widens in the longitudinal direction of the vehicle pillar from an upper part of the vehicle pillar to a lower part of the vehicle pillar.

14. The method as claimed in claim 12, wherein the vehicle pillar is a B-pillar.

15. The method as claimed in claim 1, wherein the extruded profile has a width, which is in a proportion of 1 to between 1.5 and 3 to a width or a length of the sheet metal component or the preform component.

16. The method as claimed in claim 1, wherein the produced sheet metal component has a longitudinal direction which extends transversely to an extrusion direction in which the light metal is extruded in said extruding.

17. The method as claimed in claim 1, wherein the preform component is a single wall component.

18. The method as claimed in claim 1, wherein the extruded profile is an open profile.

* * * * *